(12) United States Patent
Chen et al.

(10) Patent No.: US 9,366,064 B1
(45) Date of Patent: Jun. 14, 2016

(54) HINGE STRUCTURE

(71) Applicant: LIANHONG ART CO., LTD., Taoyuan (TW)

(72) Inventors: Chia-Hui Chen, Taoyuan (TW); Tzu-Yu Lin, Taoyuan (TW); Jih-Nan Tai, Taoyuan (TW); Yen-Ting Chen, Taoyuan (TW)

(73) Assignee: LIANHONG ART CO., LTD., Taoyuan (TW)

( * ) Notice: Subject to any disclaimer, the term of this patent is extended or adjusted under 35 U.S.C. 154(b) by 0 days.

(21) Appl. No.: 14/934,968

(22) Filed: Nov. 6, 2015

(30) Foreign Application Priority Data

May 29, 2015 (TW) .............................. 104208435 U
Sep. 10, 2015 (TW) .............................. 104214661 U

(51) Int. Cl.
  *E05D 3/12* (2006.01)
  *G06F 1/16* (2006.01)
  *E05D 11/00* (2006.01)
  *E05F 1/12* (2006.01)

(52) U.S. Cl.
  CPC .............. *E05D 3/12* (2013.01); *E05D 11/0054* (2013.01); *E05F 1/12* (2013.01); *G06F 1/1633* (2013.01); *E05D 2011/0072* (2013.01); *Y10T 16/544* (2015.01); *Y10T 16/5445* (2015.01); *Y10T 16/5448* (2015.01)

(58) Field of Classification Search
  CPC .............. E05D 3/12; E05D 1/04; E05D 1/06; E05D 2001/045; E05D 11/0054; E05D 2011/0072; E05D 11/06; E05D 11/08; E05D 11/082; E05D 11/084; E05D 11/087; Y10T 16/544; Y10T 16/5445; Y10T 16/5448; Y10T 16/53625
  See application file for complete search history.

(56) References Cited

U.S. PATENT DOCUMENTS

| 746,398 | A | * | 12/1903 | Soss | .......................... E05D 1/04 16/355 |
| 819,098 | A | * | 5/1906 | Underhill | .................. E05D 1/04 16/355 |
| 1,195,085 | A | * | 8/1916 | Raber | ..................... E05D 11/02 105/280 |
| 2,062,840 | A | * | 12/1936 | Soss | ......................... E05D 3/147 16/360 |

(Continued)

*Primary Examiner* — Jeffrey O Brien
(74) *Attorney, Agent, or Firm* — Guice Patents PLLC

(57) ABSTRACT

A hinge structure for connecting an electronic device and a stand includes a housing mounted to the housing, a cover covering the housing and a lifting member mounted to the stand, wherein a gap is formed between the lifting member and the cover, the lifting member includes an eccentric block movably disposed in the housing, a guiding member is disposed on one end of the eccentric block and includes a arced groove through which a pin movably extending, a positioning pin is positioned in a limiting groove; in another embodiment, the lifting member includes an eccentric block having a arced plate movably disposed in a rear groove and a lateral groove of the housing, whereby the hinge structure is smoothly operated in a small gap.

6 Claims, 12 Drawing Sheets

(56) References Cited

U.S. PATENT DOCUMENTS

| | | | | |
|---|---|---|---|---|
| 2,219,358 A | * | 10/1940 | Economides | E05D 1/04 16/260 |
| 2,219,918 A | * | 10/1940 | Economides | E05D 1/04 16/260 |
| 2,233,882 A | * | 3/1941 | Bobek | E05C 17/38 16/348 |
| 3,027,592 A | * | 4/1962 | Schnur | E05D 1/04 16/355 |
| 3,231,927 A | * | 2/1966 | Ammon | E05D 11/082 16/331 |
| 3,717,902 A | * | 2/1973 | Savenije | E05D 1/04 16/271 |
| 4,068,348 A | * | 1/1978 | Chivers | E05D 3/12 16/235 |
| 4,123,822 A | * | 11/1978 | Bentley | E05D 1/04 16/355 |
| 4,485,524 A | * | 12/1984 | Neville | E05D 7/081 16/241 |
| 4,683,614 A | * | 8/1987 | Anderson | E05D 1/04 16/362 |
| 4,843,680 A | * | 7/1989 | Cress | E05D 3/186 16/237 |
| 5,050,270 A | * | 9/1991 | Burgei | E05D 1/04 16/298 |
| 5,061,023 A | * | 10/1991 | Soubliere | E05D 1/04 16/355 |
| 5,465,557 A | * | 11/1995 | Harte | B65B 31/02 16/289 |
| 5,946,774 A | * | 9/1999 | Ramsey | E05D 1/04 16/355 |
| 6,292,981 B1 | * | 9/2001 | Ford | E05D 1/04 16/357 |
| 6,532,628 B2 | * | 3/2003 | Kim | G06F 1/1601 16/337 |
| 7,876,551 B2 | * | 1/2011 | Wang | E05D 3/18 16/362 |
| 8,108,971 B2 | * | 2/2012 | Florek | E05D 1/04 16/193 |
| 8,281,459 B2 | * | 10/2012 | Le | E05D 3/022 16/350 |
| 8,482,906 B2 | * | 7/2013 | Farley, Jr. | E05D 3/022 16/103 |
| 8,516,668 B2 | * | 8/2013 | Weber | B60N 2/4633 29/11 |
| 2015/0040483 A1 | * | 2/2015 | Tejima | E05D 1/04 49/386 |
| 2015/0252602 A1 | * | 9/2015 | Nielsen | E05D 11/06 16/275 |
| 2016/0083989 A1 | * | 3/2016 | Kuo | E05D 5/10 16/355 |

* cited by examiner

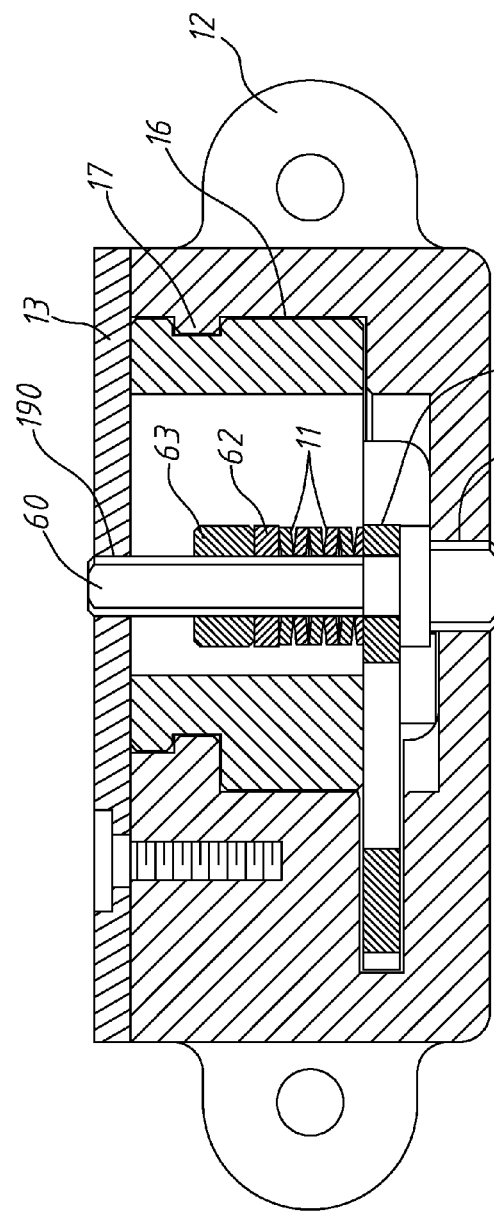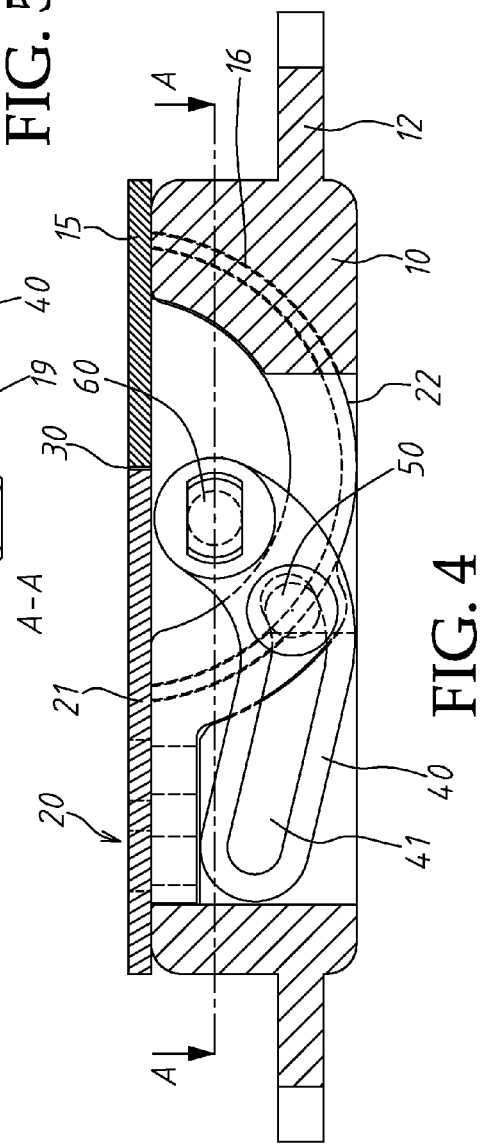
FIG. 5
FIG. 4

HINGE STRUCTURE

BACKGROUND OF THE INVENTION

1. Field of the Invention

The invention relates to a hinge structure connecting an electronic device and a stand, and in particular to a hinge structure used in a stand for an electronic device such as a laptop, wherein the hinge structure is smooth operated in a small space and suitable for modularity.

2. Description of the Related Art

Tablets which are portable devices are used to transmitting or controlling data by touching their screens.

Since the tablets are often used by both hands, users feel tired quickly. When the tablets are put on knee, it is easy to slide or shake. To solve such a problem, a stand is used to support the tablets in a predetermined angle for operation.

Conventional stands for supporting electronic devices are usually pivoted to the electronic devices at one end, and the other end becomes free end. The stand can be folded and received in the electronic device. The free end is rotated to a desired angle with respect to the pivoted end when the electronic device is used. However, such a conventional stand has an opened structure which often occupies a considerable space and a limited rotational angle. The conventional stand is also easily damaged due to impact.

BRIEF SUMMARY OF THE INVENTION

The object of the invention is to provide a hinge structure which can be smoothly operated in a very small space.

The invention provides a hinge structure. The hinge structure for connecting of an electronic device and a stand in accordance with an exemplary embodiment of the invention includes a housing disposed in the electronic device and having an opening atop, an operation space formed within the housing, an end which is closed and having a first groove, an end plate disposed on another end opposite to the end and having a second groove corresponding to the first groove, a cover covering a portion of the opening, an arced portion disposed in the operation space, a rail disposed in the arced portion; a lifting member disposed on the stand and including a planar portion covering the other portion of the opening which is not covered by the cover, an eccentric block disposed on an inner surface of the lifting member and corresponding to the arced portion and an engaging groove formed on the eccentric block and corresponding to the rail, wherein an operation gap is formed between the cover and the planar portion, the eccentric block is movably joined to the arced portion so that the engaging groove is movably joined to the rail; a guiding member disposed on an end of the eccentric block and including an arced groove and a through hole formed on a bottom of the guiding member; and a pin extending through the arced groove; a positioning pin positioned in the first groove and the second groove.

In another exemplary embodiment, the housing further includes a step portion corresponding to the arced portion, and the eccentric block further includes an extending portion configured to be joined to the planar portion and positioned in the step portion.

In yet another exemplary embodiment, the housing further includes another rail adjacent to the step portion and corresponding to the rail.

In another exemplary embodiment, the eccentric block includes a hole, the pin includes an enlarged end, and the pin extends through the arced groove so that another end of the pin is positioned in the eccentric block.

In yet another exemplary embodiment, the positioning pin movably extends through the through hole, and the elastic torsion member disposed on the positioning pin.

In another exemplary embodiment, the elastic torsion member includes a plurality of torque spacers movably disposed on the positioning pin, a cam movably disposed on the positioning pin and a pressing nut disposed on one end of the positioning pin for axial pressing and positioning.

The hinge structure for connecting of an electronic device and a stand in accordance with another exemplary embodiment of the invention includes a housing disposed in the electronic device and having an opening atop, two half-housings, two lateral plates, an operation space formed by the half-housings and lateral plates, an arced portion disposed in the operation space, a cover covering a portion of the opening, wherein each of the half-housings includes a rear protrusion and a lateral protrusion, and a guiding rail formed by the arced portion connected to a rear groove formed on the rear protrusion and two lateral groove formed on the lateral protrusions; a lifting member disposed on the stand and including a planar portion covering the other portion of the opening which is not covered by the cover and an eccentric block including a connecting end connected to the planar portion, a U-shaped portion extending from the connecting end, an arced member extending from the U-shaped portion and a groove formed on the arced member, wherein the arced member is movably disposed in the guiding rail with a front end of the arced member movably disposed in the rear groove and a rear end of the arced member movably disposed in the lateral groove, wherein an operation gap is formed between the cover and the planar portion; a guiding member disposed in the eccentric block and further disposed between the U-shaped portion and the groove and including a arced guiding groove and a through hole; a pin extending through the arced guiding groove; a positioning pin positioned in the lateral plates and movably extending through the through hole; and an elastic torsion member disposed on the positioning pin.

In another exemplary embodiment, one of the half housings includes a post and the other of the half housings includes a hole, and each of the half housings includes a positioning plate having a positioning hole, and the lateral plates are joined to the half housings through bolts and tubes having inner threads.

In yet another exemplary embodiment, the U-shaped portion further includes inner thread hole, and the pin has an outer thread and extends through the arced guiding groove to engage the inner thread hole.

In another exemplary embodiment, the guiding member further includes a slot for inserting a linking sheet having the same cross section shape of the positioning pin.

In yet another exemplary embodiment, the guiding member further includes a limiting device disposed in positions on a bottom of the guiding member and positions on the lateral protrusions.

In another exemplary embodiment, the limiting device includes limiting blocks disposed on the bottom of the guiding member and limiting portions disposed on the lateral protrusion.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4 is a cross section of the hinge structure of FIG. 1;

FIG. 5 is a cross section of hinge structure of FIG. 4 along an A-Aline;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
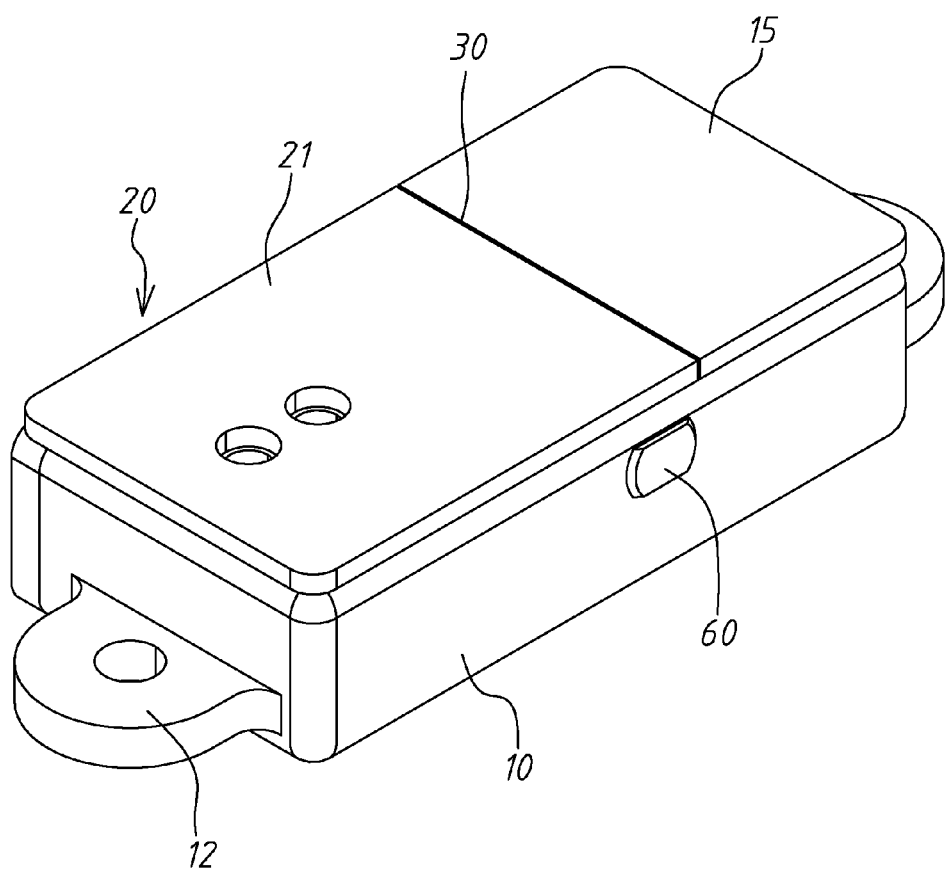
FIG. 1 is a perspective view of an embodiment of a hinge structure of the invention.
Figure 2:
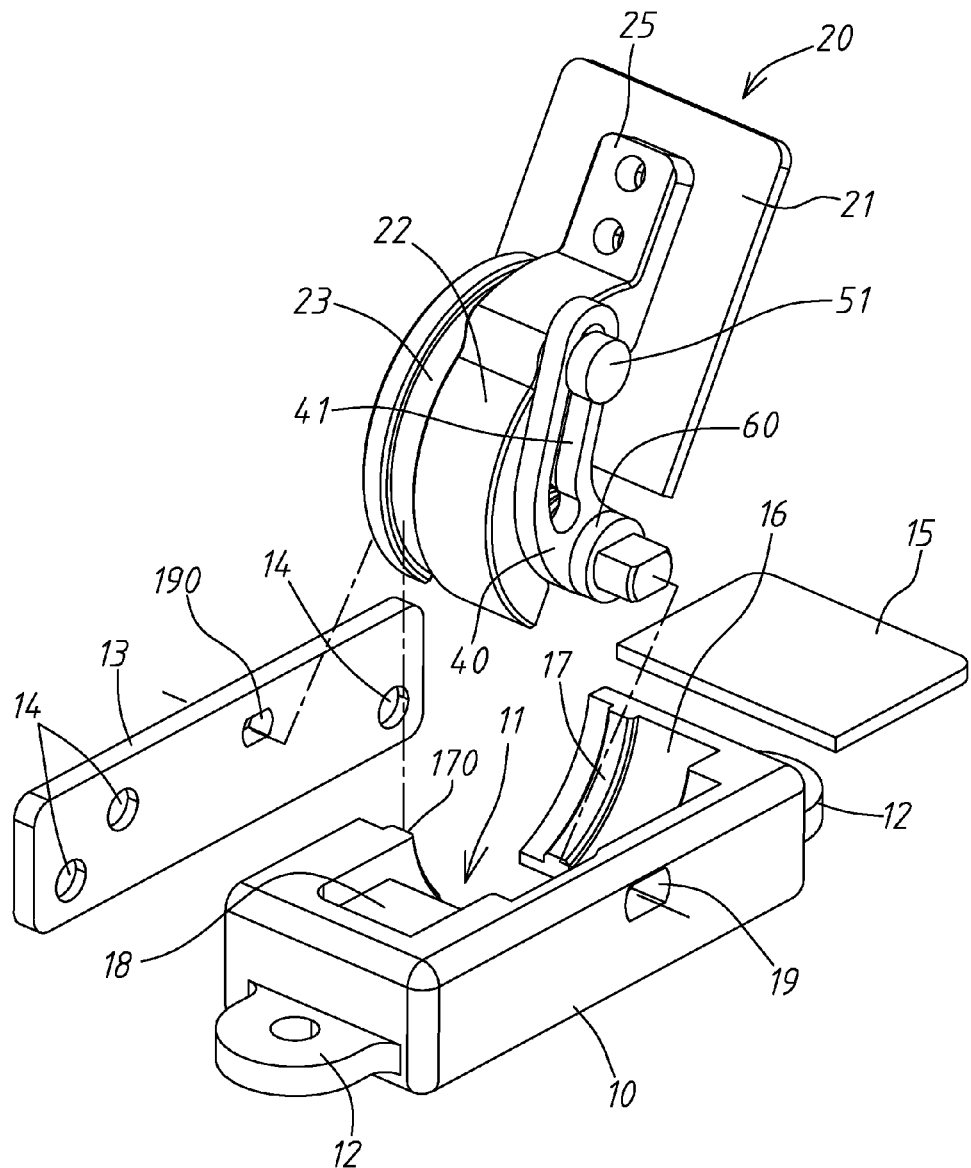
FIG. 2 is an exploded view of main elements of the hinge structure of FIG. 1.

Referring to FIGS. 1 and 2, a hinge structure of the invention for an electronic device (not shown) includes a housing 10. The housing 10 includes an opening and an operation space 11. In this embodiment, two positioning plates 12 having positioning holes are disposed on two lateral opposite sides of the housing 10 and near a bottom of the housing 10. One side of the housing 10 is a closed side (the front side shown in FIGS. 1 and 2), and an end plate 13 is disposed on a side of the housing 10 opposite to the closed side (the rear side shown in FIGS. 1 and 2). The end plate 13 is mounted to the housing 10 through predetermined holes 14. A cover 15 covers a portion of the opening of the housing 10. The end plate 13 and the cover 15 are used as an embodiment, but they are not limited thereto. An arced portion 16 is disposed in the operation space 11. The arced portion 16 includes a rail 17. A step portion 18 is disposed in the operation space 11, and preferably a corresponding rail 170 is disposed near the step portion 18. A first groove 19 and a second groove 190 are disposed on the closed end and the end plate 13.

Figure 3:
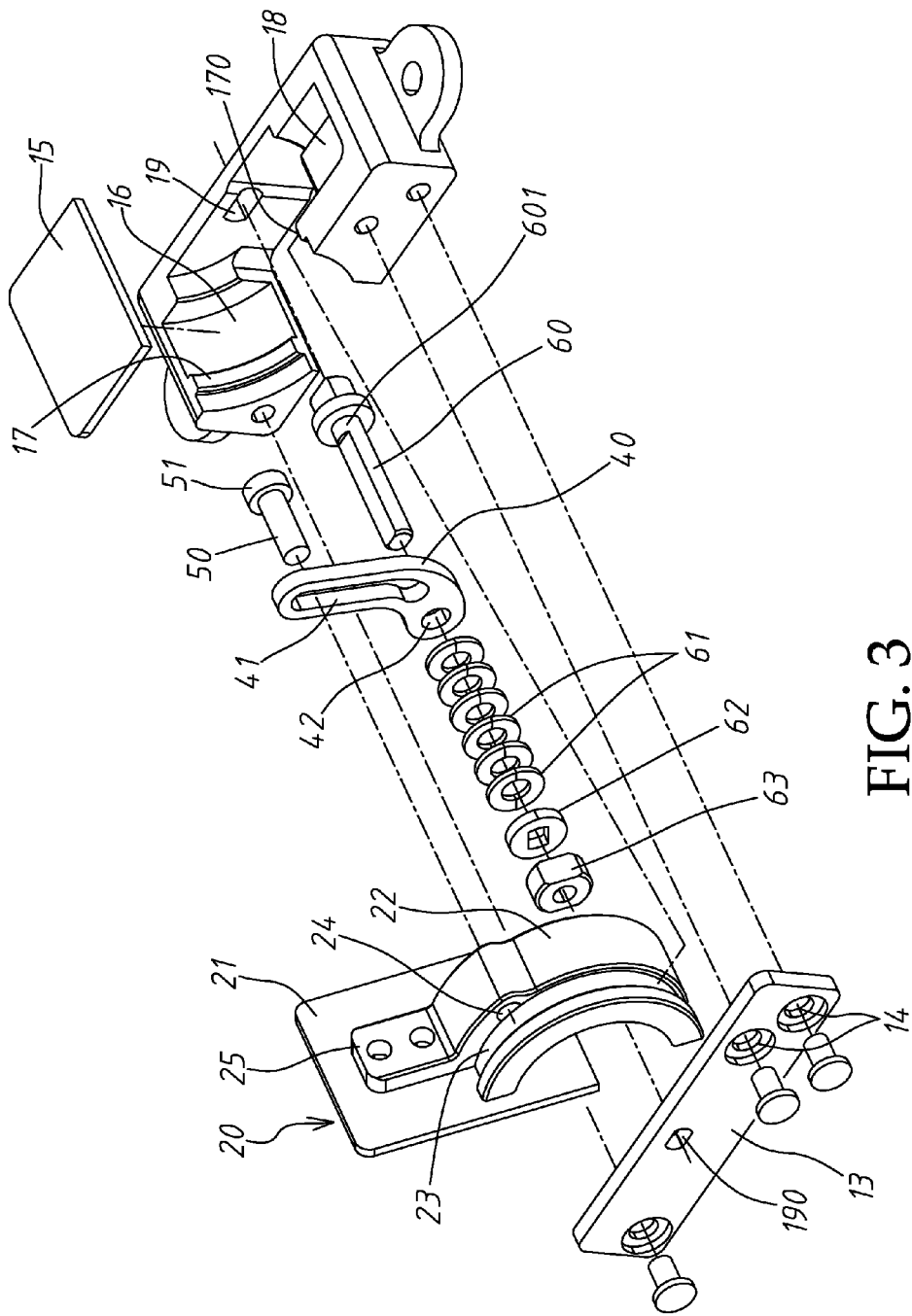
FIG. 3 is an exploded view of all elements of the hinge structure of FIG. 1.

Referring to FIGS. 1 to 3, a lifting member 20 which can be mounted to a stand (not shown) includes a planar portion 21 which covers the other portion of the opening which is not covered by the cover 15. A small gap 30 is formed between the planar portion 21 and the cover 15 (see FIG. 1). An eccentric block 22 corresponding to the arced portion 16 is disposed on the planar portion 21. An engaging groove 23 is formed on the eccentric block 22 and corresponds to the rail 17. The eccentric block 22 is movably mounted to the arced portion 16 through the rail 17 movably joined to the engaging groove 23 (see FIGS. 4 and 5). In this embodiment, the eccentric block 22 further includes an extending portion 25 joined to the planar portion 21 so that the extending portion 25 is positioned to the step portion 18.

As shown in FIG. 3, a guiding member 40 is disposed on one end of the eccentric block 22. The guiding member 40 includes an arced groove 41 and a through hole 42 near a bottom of the guiding member 40. A pin 50 extends through the arced groove 41. In this embodiment, the pin 50 includes an enlarged end 51 which enables the other end of the pin 50 to position in a corresponding hole 24 of the eccentric block 22 when the pin 50 extends through the arced groove 41. A positioning pin 60 is positioned in the front end and the rear end of the housing 10. In this embodiment, the positioning pin 60 has two D-shaped ends fitting to the first groove 19 and the second groove 190 which have the same cross section as the two ends of the pin 60. The pin 60 has a body 601 movably extending through the through hole 42 of the guiding member 40. An elastic torsion member is disposed on the pin 60 to provide axial positioning for the guiding member 40 when the guiding member 40 is rotated to various angles. In this embodiment, referring to FIGS. 3 and 5, the elastic torsion member includes a plurality of torsion spacers 61 disposed on a D-shaped portion of the positioning pin 60 other than the body 601, a cam 62 disposed on the D-shaped portion and a pressing nut 63 pressing the torsion spacers 61 and the cam 62.

Figure 6:
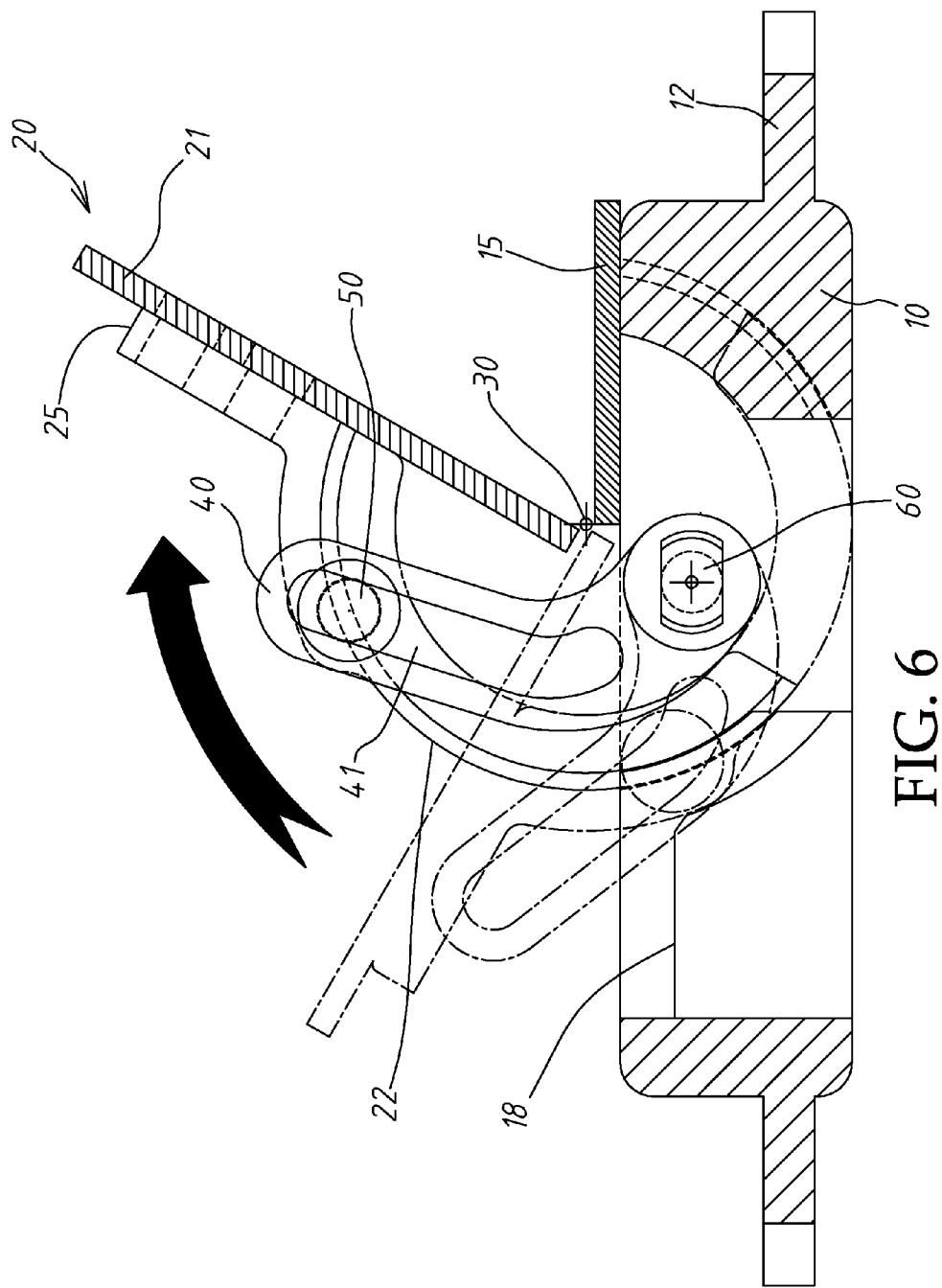
FIG. 6 is a schematic view of the hinge structure of FIG. 4, wherein a lifting member is lifted.
Figure 7:
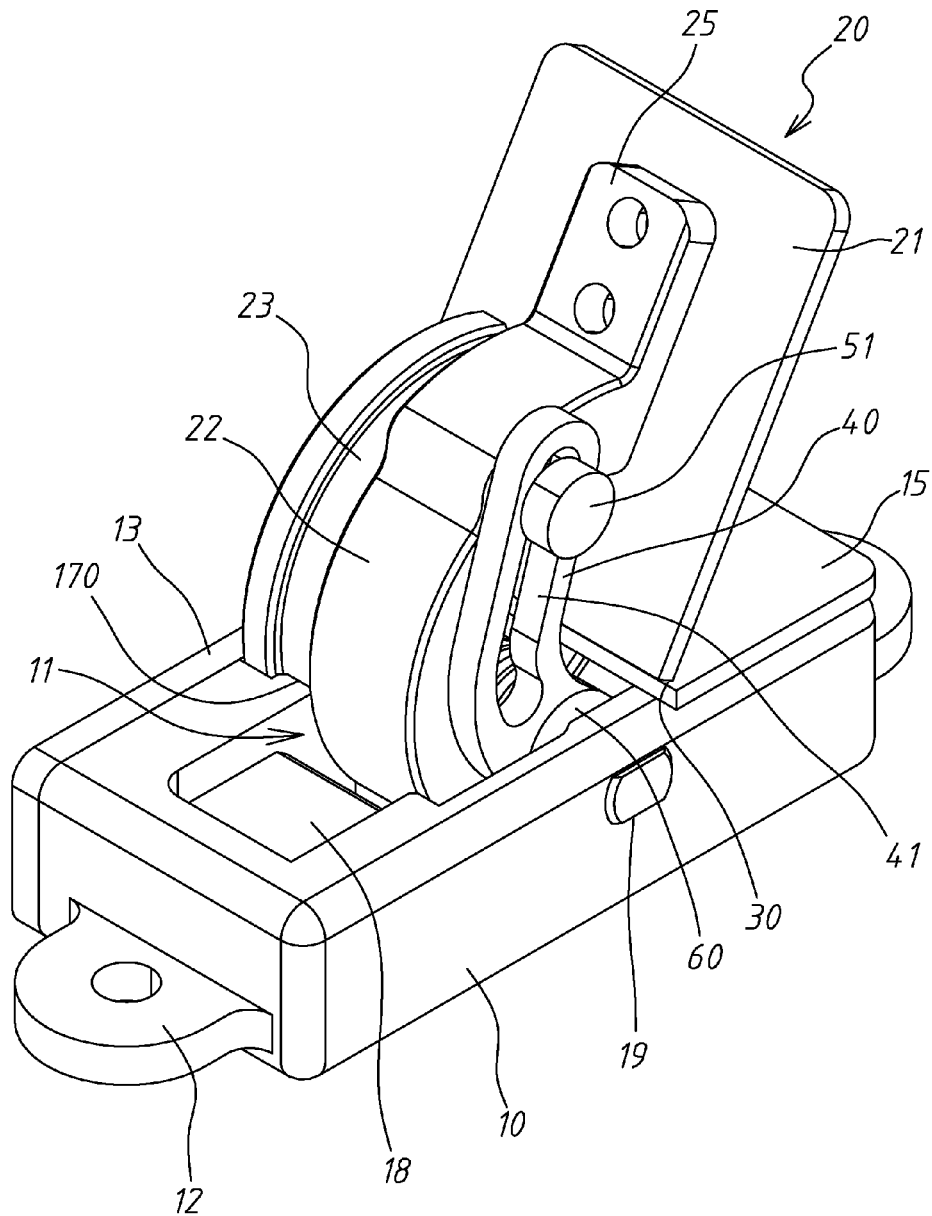
FIG. 7 is s perspective view of FIG. 6.

Referring to FIGS. 6 and 7, when the planar portion 21 is lifted, the eccentric block 22 and the engaging groove 23 are guided by the arced portion 16, the rail 17 and the corresponding rail 170 to rotate for an angle. During the rotation, the guiding member 40 is rotated with respect to the positioning pin 60 simultaneously, and the pin 50 is moved from one end of the arced groove 41 to another end of the arced groove 41. The planar portion 21 of the lifting member 20 can be positioned at any angle by the elastic torsion member.

Figure 8:
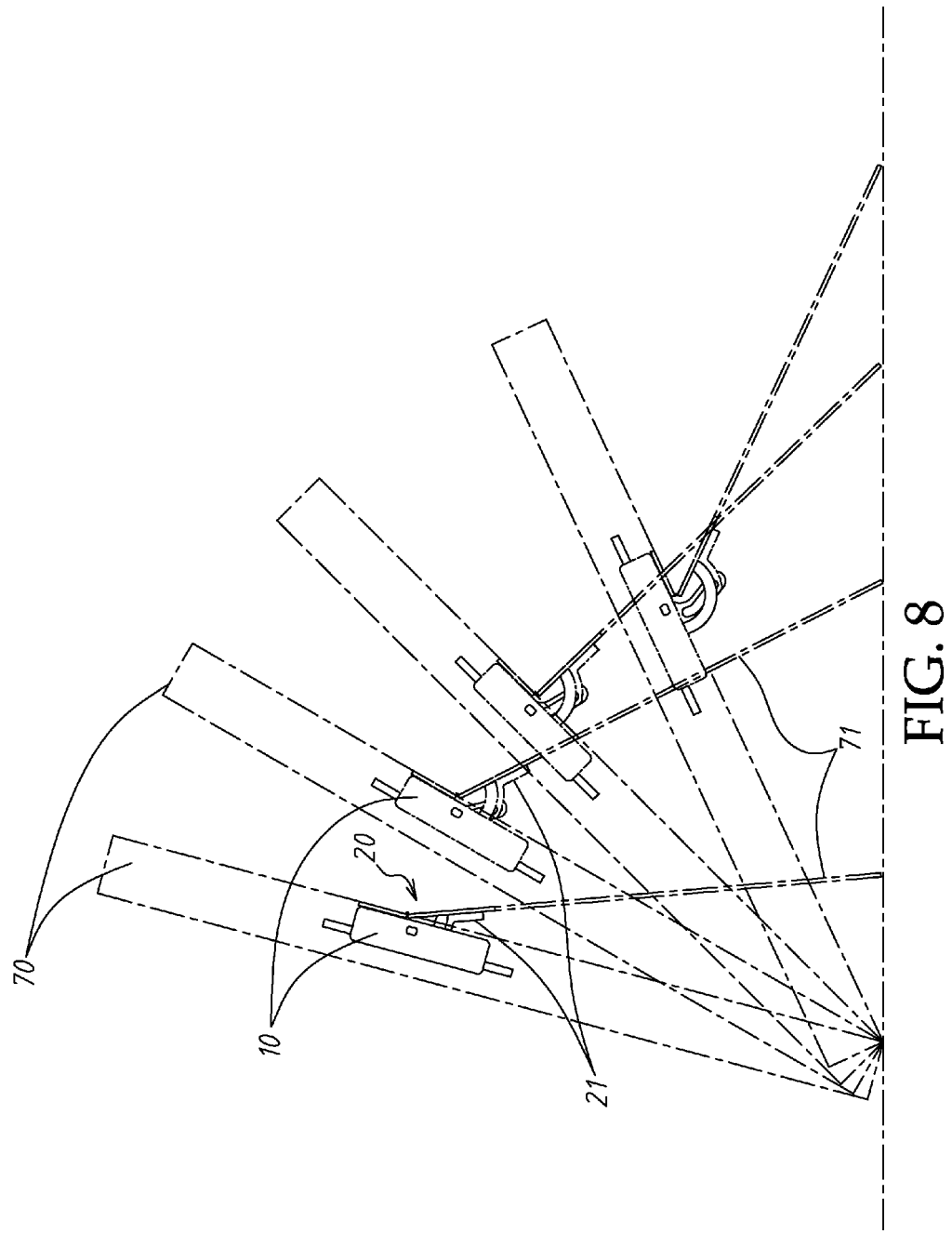
FIG. 8 depicts an electronic device supported by a stand in various angles.

Referring to FIG. 8, the hinge structure of the invention can be mounted to a back side of an electronic device 70, and the planar portion 21 is linked to a stand 71 of the electronic device 70, whereby no matter what angle the stand 71 is opened, the electronic device 70 is supported by the stand 71.

In this embodiment, the hinge structure of the invention includes a housing 10, and only a very small gap is needed between the planar portion 21 of the lifting member 20 and the cover 15 for operation, which reduces the total volume of the hinge structure and prevents foreign matter from entering the housing 10. The hinge structure is suitable for modularity and able to maintain a stable torque and increase support angle.

Figure 9:
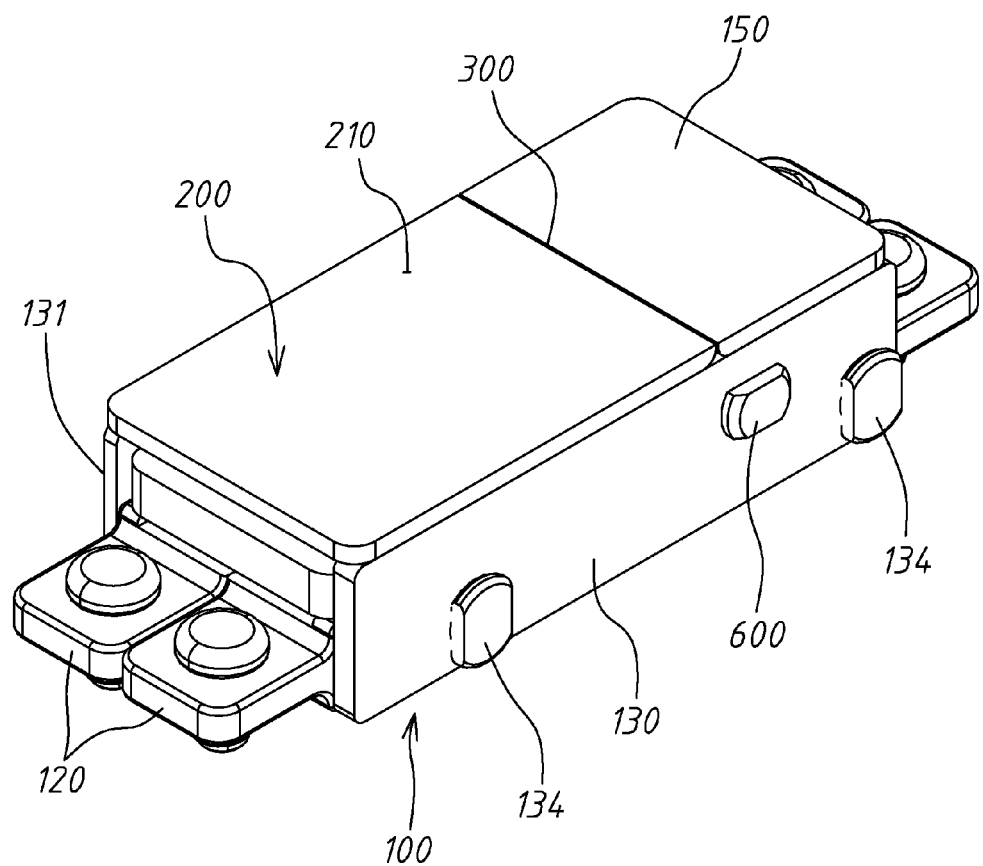
FIG. 9 is another embodiment of a hinge structure of the invention.
Figure 10:
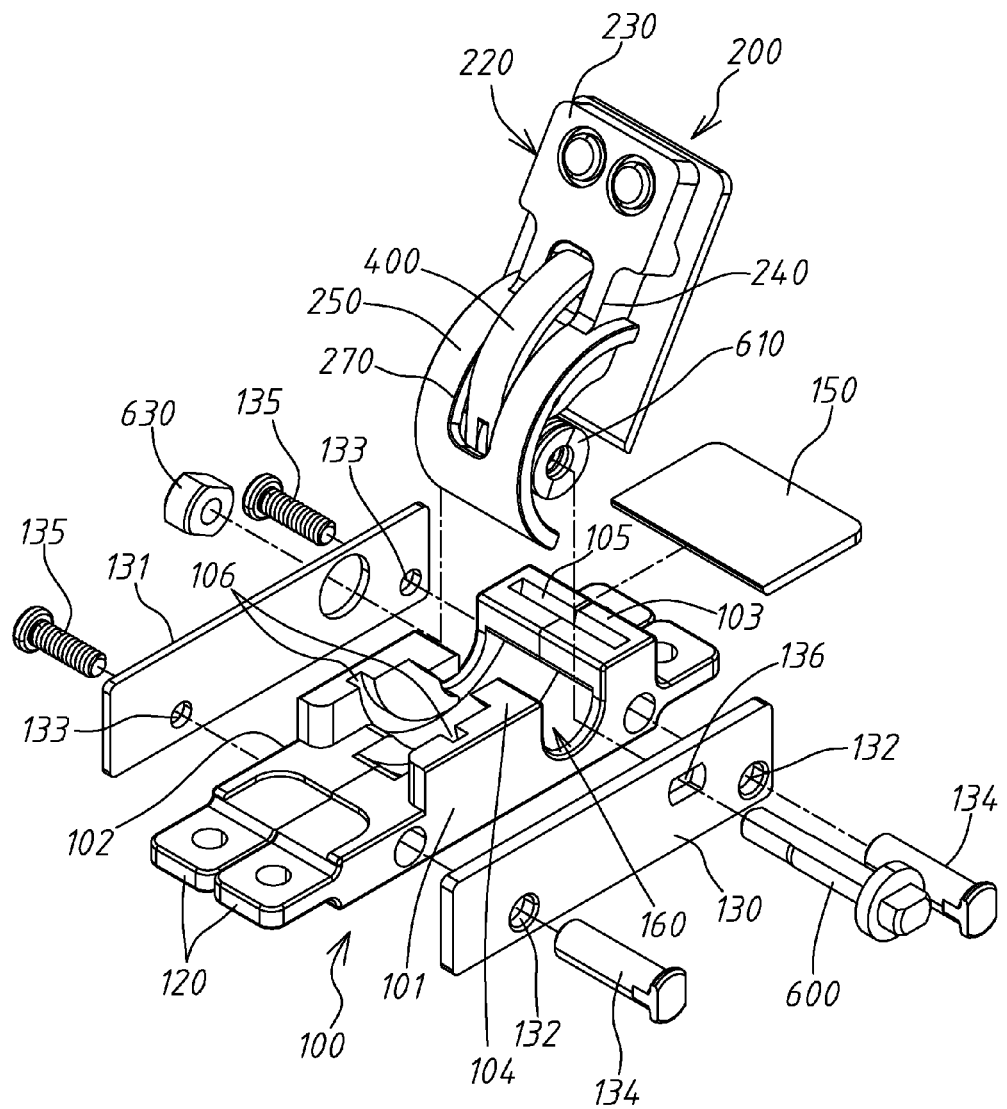
FIG. 10 is an exploded view of main elements of the hinge structure of FIG. 9.

Referring to FIGS. 9 and 10, a hinge structure of the invention includes a housing 100. The housing 100 includes an opening and an operation space. In this embodiment, the housing 100 includes two half-housings 101 and 102 and two lateral plates 130 and 131. The half-housings 101 and 102 and the lateral plates 130 and 131 constitute the operation space. The half-housing 101 is joined to the half-housing 102 through a post 107 inserted into a hole 108. Each of The half-housing 101 and the half-housing 102 has a positioning plate 120 disposed on an end near a bottom. The lateral plates 130 and 131 are joined to the half-housing 101 and 102 through bolts 135 inserted into holes 132 and 133 on the lateral plates 130 and 131 and holes on the half-housings 101 and 102 to engage tubes 134 and 135 having inner threads. A positioning pin 600 is inserted into a positioning hole 136 formed on the lateral plate 130. A cover 150 covers a portion of the opening, and a lifting member 200 covers other portion of the opening. A small gap 300 is formed between the lifting member 200 and the cover 150. An arced portion 160 is disposed in the operation space. A guiding rail is formed by the arced portion 160 connected to a rear groove 105 formed on the rear protrusion 103 and two lateral groove 106 formed on the lateral protrusions 104.

Figure 11:
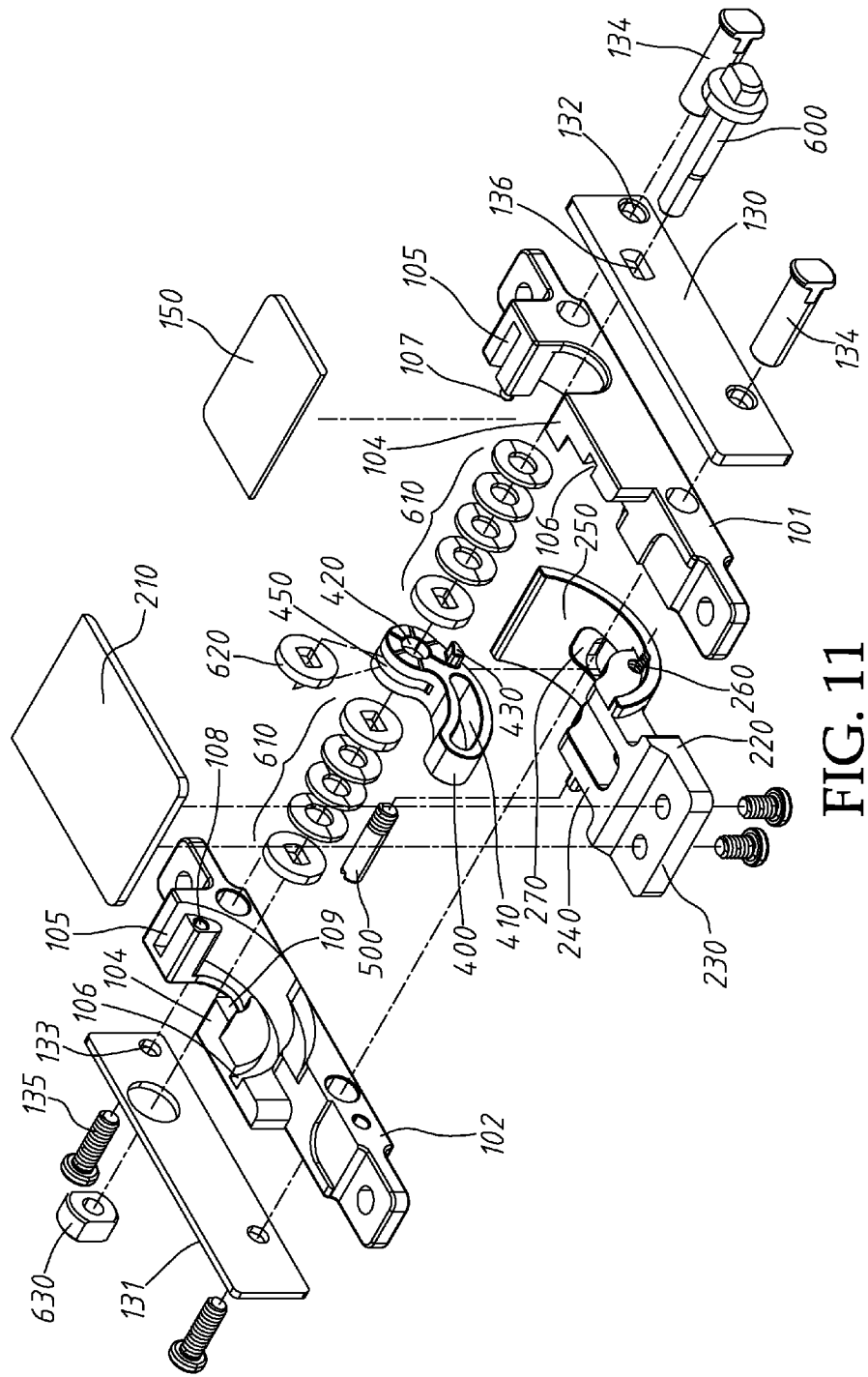
FIG. 11 is an exploded view of all elements of the hinge structure of FIG. 9.

Referring to FIGS. 9 to 11, the lifting member 200 which can be mounted to a stand (not shown) includes a planar portion 210. The planar portion 210 covers the other portion which is not covered by cover 150. A small gap 300 is formed between the planar portion 210 and the cover 150 (see FIG. 9). The lifting member 200 includes an eccentric block 220. The eccentric block 220 includes a connecting end 230 joined to the planar portion 210, a U-shaped portion 240 extending from the connecting end 230 and an arced member 250 extending from the U-shaped portion 240. The U-shaped portion 240 has inner thread holes 260, and the arced member 250 has a groove 270. The arced member 250 is movably disposed in the guiding rail with a front end of the arced member 250 movably disposed in the rear groove 105 and a rear end of the arced member 170 movably disposed in the lateral groove 106.

Referring to FIG. 11, a guiding member 400 is disposed in the eccentric block 220 and disposed between the U-shaped portion and the groove 270. The guiding member 400 includes an arced guiding groove 410 and a through hole 420 formed near a bottom of the guiding member 400. A pin 500 movably extends through the arced groove 410 and engages the inner thread hole 260. A positioning pin 600 extends through the positioning hole 136 on the lateral plate 130. An elastic torsion member is disposed on the positioning pin 600 for positioning the guiding member 400 at any angle. In this embodiment, the elastic torsion member includes a plurality of torsion spacers 610 disposed on two sides of the through hole 420 of the guiding member 400 and a pressing nut 630 axially pressing the torsion spacers 610. In this embodiment, the guiding member 400 further includes a slot 450 for inserting a linking sheet 620 having the same cross section shape of the positioning pin 600. In this embodiment, a limiting block 430 is disposed on the guiding member 400, and a limiting portion 109 corresponding to the limiting block 430 is disposed on the lateral protrusions 104 for limiting the movement of the guiding member 400.

Figure 12:
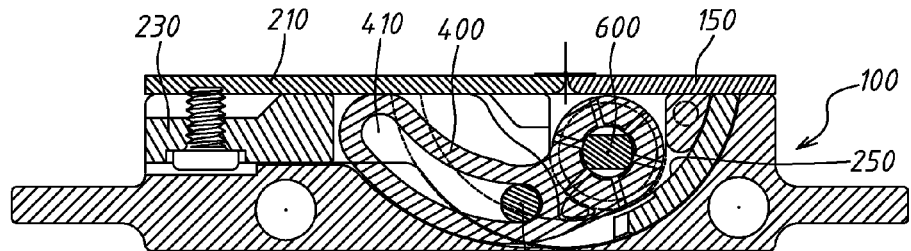
FIG. 12 is a cross section of FIG. 9.
Figure 13:
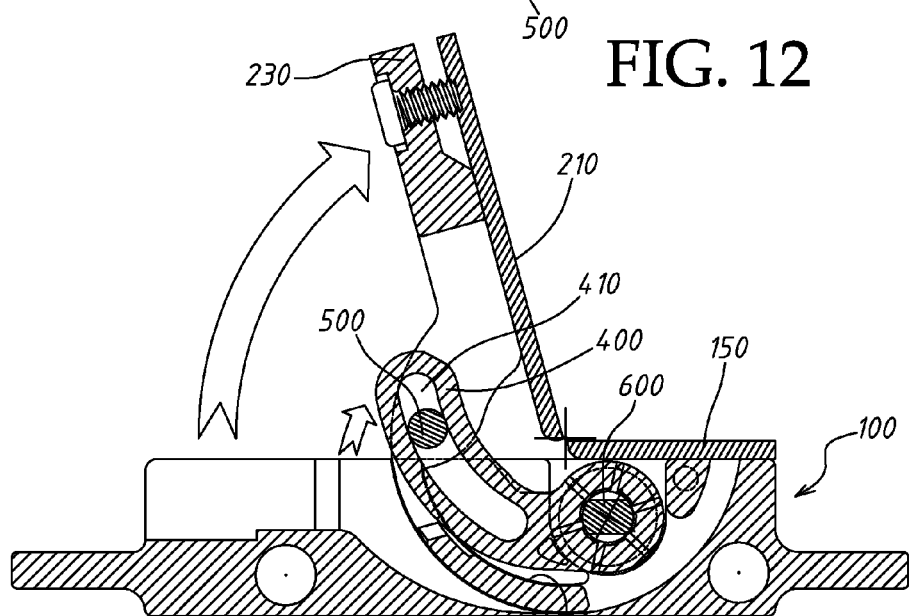
FIG. 13 depicts a lifting member of FIG. 12 is lifted.
Figure 14:
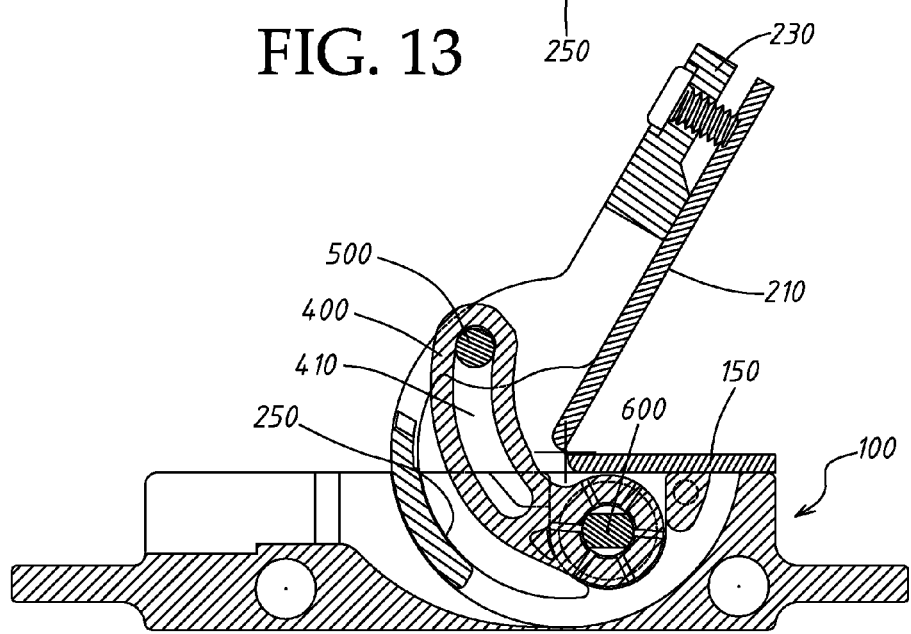
FIG. 14 depicts the lifting member of FIG. 13 is lifted completely.
Figure 15:
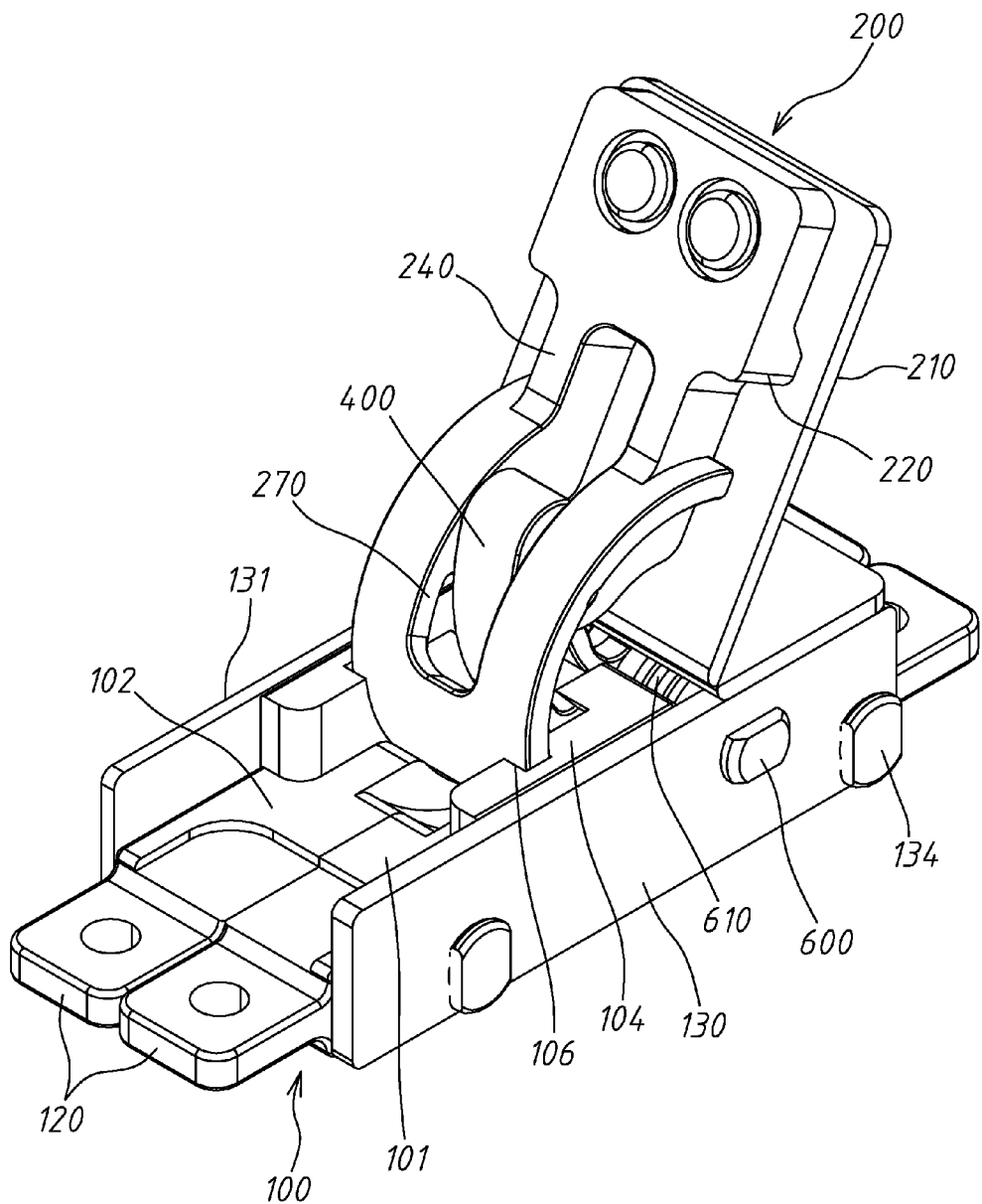
FIG. 15 is a perspective view of FIG. 14.

Referring to FIGS. 12 and 13, when the planar portion 210 is lifted, the arced member 250 moves in the rear groove 105 and the lateral groove 106 along a direction shown in FIG. 5. The guiding member 400 is rotated with respect to the positioning pin 600, and the pin 500 moves from one end to the other end of the arced groove 410 so that the lifting member 200 is lifted completely as shown in FIGS. 14 and 15. The lifting member 200 can be positioned at any angle by the elastic torsion member.

In this embodiment, the hinge structure of the invention includes a housing 100, and only a very small gap is needed between the planar portion 210 of the lifting member 200 and the cover 150 for operation, which reduces the total volume of the hinge structure and prevents foreign matter from entering the housing 100. The hinge structure provides a stable and reliable rotation through the eccentric block 220 and the guiding mechanism of the housing 100.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hinge structure for connecting of an electronic device and a stand, comprising:
   a housing disposed in the electronic device and having an opening atop, two half-housings, two lateral plates, an operation space formed by the half-housings and lateral plates, an arced portion disposed in the operation space, a cover covering a portion of the opening, wherein each of the half-housings comprises a rear protrusion and a lateral protrusion, and a guiding rail formed by the arced portion connected to a rear groove formed on the rear protrusion and two lateral grooves formed in the lateral protrusions;
   a lifting member disposed on the stand and comprising a planar portion covering the other portion of the opening which is not covered by the cover and an eccentric block comprising a connecting end connected to the planar portion, a U-shaped portion extending from the connecting end, an arced member extending from the U-shaped portion and a groove formed on the arced member, wherein the arced member is movably disposed in the guiding rail with a front end of the arced member movably disposed in the rear groove and a rear end of the arced member movably disposed in the lateral grooves, wherein an operation gap is formed between the cover and the planar portion;
   a guiding member disposed in the eccentric block and further disposed between the U-shaped portion and the groove and comprising an arced guiding groove and a through hole;
   a pin extending through the arced guiding groove;
   a positioning pin positioned in the lateral plates and movably extending through the through hole; and
   an elastic torsion member disposed on the positioning pin.

2. The hinge structure as claimed in claim 1, wherein one of the half housings comprises a post and the other of the half housings comprises a hole, and each of the half housings comprises a positioning plate having a positioning hole, and the lateral plates are joined to the half housings through bolts engaging tubes having inner threads.

3. The hinge structure as claimed in claim 1, wherein the U-shaped portion further comprises inner thread hole, and the pin has an outer thread and extends through the arced guiding groove to engage the inner thread hole.

4. The hinge structure as claimed in claim 1, wherein the guiding member further comprises a slot for inserting a linking sheet having the same cross section shape of the positioning pin.

5. The hinge structure as claimed in claim 1, wherein the guiding member further comprises a limiting device disposed in positions on a bottom of the guiding member and positions on the lateral protrusions.

6. The hinge structure as claimed in claim 5, wherein the limiting device comprises limiting blocks disposed on the bottom of the guiding member and limiting portions disposed on the lateral protrusions.

* * * * *